(12) United States Patent
Tsuchitoi

(10) Patent No.: US 10,135,869 B2
(45) Date of Patent: Nov. 20, 2018

(54) INFORMATION PROCESSING SYSTEM, INFORMATION PROCESSING APPARATUS, AND METHOD FOR CONTROLLING INFORMATION PROCESSING SYSTEM

(71) Applicant: CANON KABUSHIKI KAISHA, Tokyo (JP)

(72) Inventor: Naoki Tsuchitoi, Kashiwa (JP)

(73) Assignee: Canon Kabushiki Kaisha, Tokyo (JP)

( * ) Notice: Subject to any disclaimer, the term of this patent is extended or adjusted under 35 U.S.C. 154(b) by 98 days.

(21) Appl. No.: 14/816,457

(22) Filed: Aug. 3, 2015

(65) Prior Publication Data
US 2016/0044062 A1    Feb. 11, 2016

(30) Foreign Application Priority Data
Aug. 5, 2014 (JP) ................................. 2014-159841

(51) Int. Cl.
*H04L 29/06* (2006.01)
*H04W 12/08* (2009.01)

(52) U.S. Cl.
CPC .............. *H04L 63/20* (2013.01); *H04L 63/10* (2013.01); *H04W 12/08* (2013.01)

(58) Field of Classification Search
USPC ............................................................ 726/1
See application file for complete search history.

(56) References Cited

U.S. PATENT DOCUMENTS

| 7,941,667 | B2 * | 5/2011 | Miyazaki | ................ | G06F 21/64 |
| | | | | | 713/176 |
| 7,992,188 | B2 * | 8/2011 | Ohta | ................... | G06F 21/6209 |
| | | | | | 705/67 |
| 8,387,109 | B2 * | 2/2013 | Ureche | ............... | G06F 21/6218 |
| | | | | | 707/694 |

(Continued)

FOREIGN PATENT DOCUMENTS

| JP | 2005-122474 A | 5/2005 |
| JP | 2006-260085 A | 9/2006 |

(Continued)

*Primary Examiner* — Amare F Tabor
(74) *Attorney, Agent, or Firm* — Canon USA, Inc. I.P. Division

(57) ABSTRACT

An information processing system includes a first information processing apparatus for setting a security policy, and a second information processing apparatus subject to a function restriction according to the security policy set by the first information processing apparatus. The first information processing apparatus includes a generation unit generating forced data based on the security policy to set. The forced data includes a setting value for determining an operation of the second information processing apparatus and control information for controlling prohibition of a change of the setting value in the second information processing apparatus. The second information processing apparatus includes an application unit performing application processing for setting the setting value included in the forced data generated by the first information processing apparatus to the second information processing apparatus and enabling a prohibition control on a change of the setting value based on the control information about the setting value.

10 Claims, 19 Drawing Sheets

(56) References Cited

U.S. PATENT DOCUMENTS

| | | | | |
|---|---|---|---|---|
| 8,458,301 B1* | 6/2013 | Andrus | ............... | H04L 41/0816 709/220 |
| 8,458,766 B2* | 6/2013 | Harrison | ............. | H04L 63/0263 726/1 |
| 8,656,507 B2* | 2/2014 | Honda | ................ | G06F 21/6218 726/1 |
| 8,677,450 B2* | 3/2014 | Lum | ........................ | H04L 63/20 726/1 |
| 8,683,208 B2* | 3/2014 | Hayashi | ............. | G06F 12/1441 713/164 |
| 9,083,749 B1* | 7/2015 | Roth | ........................ | H04L 63/20 |
| 9,497,220 B2* | 11/2016 | Cardamore | ............. | H04L 63/20 |
| 2004/0103310 A1* | 5/2004 | Sobel | ...................... | H04L 63/20 726/15 |
| 2009/0083831 A1* | 3/2009 | Kanai | .................. | G06F 21/608 726/1 |
| 2009/0178110 A1* | 7/2009 | Higuchi | ................ | G06F 13/387 726/1 |
| 2009/0304228 A1* | 12/2009 | Ishikawa | ............. | H04N 1/0084 382/100 |
| 2010/0037311 A1* | 2/2010 | He | ...................... | H04L 63/0209 726/15 |
| 2010/0169664 A1* | 7/2010 | Danois | .................... | G06F 21/72 713/189 |
| 2011/0145560 A1* | 6/2011 | Moon | ............ | H04N 21/234327 713/150 |
| 2011/0154325 A1* | 6/2011 | Terasaki | .................. | G06F 9/455 718/1 |
| 2012/0017258 A1* | 1/2012 | Suzuki | .................. | G06F 21/604 726/1 |
| 2012/0079610 A1* | 3/2012 | Yamashima | ........... | H04N 5/913 726/30 |
| 2012/0190338 A1* | 7/2012 | Andersson | .............. | G06F 21/33 455/411 |
| 2012/0216248 A1* | 8/2012 | Alperovitch | ........ | H04L 63/1425 726/1 |

FOREIGN PATENT DOCUMENTS

| | | |
|---|---|---|
| JP | 2009-230178 A | 10/2009 |
| JP | 2014-032595 A | 2/2014 |

* cited by examiner

FIG.5

| | SETTING VALUE | |
|---|---|---|
| USE IPP PRINTING/SSL | ON | ~410 |
| USE SMTP/SSL | OFF | ~411 |
| USE SSL COMMUNICATION WITH HIGH ENCRYPTION STRENGTH | ON | ~412 |
| USE IPsec COMMUNICATION WITH HIGH ENCRYPTION STRENGTH | ON | ~413 |
| USE USER AUTHENTICATION | OFF | ~414 |
| LIMIT CHARACTERS FOR USER AUTHENTICATION/PASSWORD | ON | ~415 |

FIG.6

| | ACCESS CONTROL VALUE | |
|---|---|---|
| USE IPP PRINTING/SSL | OFF | ~1110 |
| USE SMTP/SSL | OFF | ~1111 |
| USE SSL COMMUNICATION WITH HIGH ENCRYPTION STRENGTH | OFF | ~1112 |
| USE IPsec COMMUNICATION WITH HIGH ENCRYPTION STRENGTH | OFF | ~1113 |
| USE USER AUTHENTICATION | OFF | ~1114 |
| LIMIT CHARACTERS FOR USER AUTHENTICATION/PASSWORD | OFF | ~1115 |

FIG.8A

| | NETWORK COMMUNICATION POLICY | | | |
|---|---|---|---|---|
| | ENCRYPT COMMUNICATION PATH | | LIMIT ENCRYPTION STRENGTH TO HIGH | |
| | YES | NO | YES | NO |
| USE IPP PRINTING/SSL | VALUE = ON CONTROL = ON | CONTROL = OFF | — | — |
| USE SMTP/SSL | VALUE = ON CONTROL = ON | CONTROL = OFF | — | — |
| USE SSL COMMUNICATION WITH HIGH ENCRYPTION STRENGTH | — | — | VALUE = ON CONTROL = ON | CONTROL = OFF |
| USE IPsec COMMUNICATION WITH HIGH ENCRYPTION STRENGTH | — | — | VALUE = ON CONTROL = ON | CONTROL = OFF |
| USE USER AUTHENTICATION | — | — | — | — |
| LIMIT CHARACTERS FOR USER AUTHENTICATION/PASSWORD | — | — | — | — |

FIG.8B

| | AUTHENTICATION POLICY | | | |
|---|---|---|---|---|
| | DISABLE GUEST USE | | LIMIT PASSWORD TO STRONG ONES | |
| | YES | NO | YES | NO |
| USE IPP PRINTING/SSL | — | — | — | — |
| USE SMTP/SSL | — | — | — | — |
| USE SSL COMMUNICATION WITH HIGH ENCRYPTION STRENGTH | — | — | — | — |
| USE IPsec COMMUNICATION WITH HIGH ENCRYPTION STRENGTH | — | — | — | — |
| USE USER AUTHENTICATION | VALUE = ON CONTROL = ON | CONTROL = OFF | — | — |
| LIMIT CHARACTERS FOR USER AUTHENTICATION/PASSWORD | — | — | VALUE = ON CONTROL = ON | CONTROL = OFF |

FIG.18

| | NETWORK COMMUNICATION POLICY | | | | |
|---|---|---|---|---|---|
| | ENCRYPT COMMUNICATION PATH | | LIMIT ENCRYPTION STRENGTH TO HIGH | | |
| | YES | NO | YES | NO | |
| USE IPsec | — | — | — | — | |
| USE IPP PRINTING/SSL | VALUE = ON<br>CONTROL = ON<br>EXCLUDE: IPsec = ON | CONTROL = OFF | — | — | |
| USE SMTP/SSL | VALUE = ON<br>CONTROL = ON<br>EXCLUDE: IPsec = ON | CONTROL = OFF | — | — | |
| USE SSL COMMUNICATION WITH HIGH ENCRYPTION STRENGTH | — | — | VALUE = ON<br>CONTROL = ON | CONTROL = OFF | |
| USE IPsec COMMUNICATION WITH HIGH ENCRYPTION STRENGTH | — | — | VALUE = ON<br>CONTROL = ON | CONTROL = OFF | |
| USE USER AUTHENTICATION | — | — | — | — | |
| LIMIT CHARACTERS FOR USER AUTHENTICATION/PASSWORD | — | — | — | — | |

INFORMATION PROCESSING SYSTEM, INFORMATION PROCESSING APPARATUS, AND METHOD FOR CONTROLLING INFORMATION PROCESSING SYSTEM

BACKGROUND OF THE INVENTION

Field of the Invention

The present invention relates to a security setting of an apparatus.

Description of the Related Art

In recent years, multifunction peripherals have become connected to a network not only to simply print and transmit image data but also to store image data and provide file service functions for personal computers (PCs). As a result, the multifunction peripherals have functions almost similar to those of other server apparatuses existing on a network.

PCs and server apparatuses (file servers and authentication servers) connected to a network in an office are required to be operated according to a security policy defined by each office. As employed herein, a security policy refers to basic guidelines on security of the entire company. In a broader sense, a security policy includes security measure standards and individual specific implementation procedures. More specifically, a security policy refers to definitions of guidelines for preventing unintended use of information, intrusion from outside, and leakage of secrets. Examples of the guidelines include who is allowed to read which piece of information, which operation is permitted to whom, and data to be encrypted.

Having a lot of functions as a server apparatus, recent multifunction peripherals are also required to adhere to a security policy similar to server apparatuses. As employed herein, adhering to a security policy refers to imposing restrictions on security-related operations to prevent unauthorized use of an apparatus in an office and information leakage. This includes, for example, disabling guest use when operating an apparatus, and requiring communication path encryption.

A conventional multifunction peripheral can be operated to adhere to the security policy if the administrator operates several operation settings (hereinafter, referred to as user mode settings) of the apparatus. However, with conventional user mode settings, the administrator needs to properly set a large number of setting items. Unless the setting items are properly set, an operation violating the security policy may be practically permitted to threaten the security of the office.

In view of this, a system has been discussed in which a security policy can be set from outside in addition to the user mode settings. The security policy and the user mode settings are compared at startup time, and if it is determined that the settings can adhere to the security policy, the apparatus is permitted to start up (Japanese Patent Application Laid-Open No. 2009-230178).

In the conventional system, when a security policy is introduced, the user mode settings may violate the security policy. In such a case, the activation of a multifunction peripheral may cause a security risk such as information leakage and unauthorized use. To address the problem, the user mode settings need to be changed to adhere to the security policy. However, a multifunction peripheral has a large number of setting items for user mode settings, and it is difficult for the administrator to determine which settings to change to adhere to the security policy.

Take, for example, the apparatus discussed in Japanese Patent Application Laid-Open No. 2009-230178. If the user mode settings do not satisfy the security policy at startup time, the apparatus can be started up by the user changing the user mode settings to satisfy the security policy. However, if there are a large number of setting items for user mode settings to be made in a multifunction peripheral, it is difficult for the user to determine setting items to be changed to satisfy the security policy. Moreover, in the case of the apparatus discussed in Japanese Patent Application Laid-Open No. 2009-230178, even if the user mode settings satisfy the security policy at startup time, the user can change the user mode settings after startup, and the apparatus may be used with the security policy violated.

SUMMARY OF THE INVENTION

The present invention is directed to providing a mechanism that can change a setting of an apparatus in order to adhere to a security policy and allow a change of a setting while maintaining a state of adhering to the security policy.

According to an aspect of the present invention, an information processing system includes a first information processing apparatus configured to set a security policy, and a second information processing apparatus which is subject to a function restriction according to the security policy set by the first information processing apparatus, wherein the first information processing apparatus includes a generation unit configured to generate forced data based on the security policy to be set, the forced data including a setting value for determining an operation of the second information processing apparatus and control information for controlling prohibition of a change of the setting value in the second information processing apparatus, and wherein the second information processing apparatus includes an application unit configured to perform application processing for setting up the setting value included in the forced data generated by the first information processing apparatus in the second information processing apparatus and enabling a prohibition control on a change of the setting value based on the control information about the setting value included in the forced data.

Further features of the present invention will become apparent from the following description of exemplary embodiments with reference to the attached drawings.

BRIEF DESCRIPTION OF THE DRAWINGS

FIG. 5 is a diagram illustrating an example of a logical structure of an apparatus setting storage unit.

FIG. 6 is a diagram illustrating an example of a logical structure of an access control information storage unit.

FIGS. 8A and 8B are diagrams illustrating a logical structure of a policy conversion rule according to the first exemplary embodiment.

FIG. 18 is a diagram illustrating an example of a logical structure of a policy conversion rule according to a third exemplary embodiment.

DESCRIPTION OF THE EMBODIMENTS

A mode for carrying out the present invention will be described below with reference to the drawings.

Figure 1:
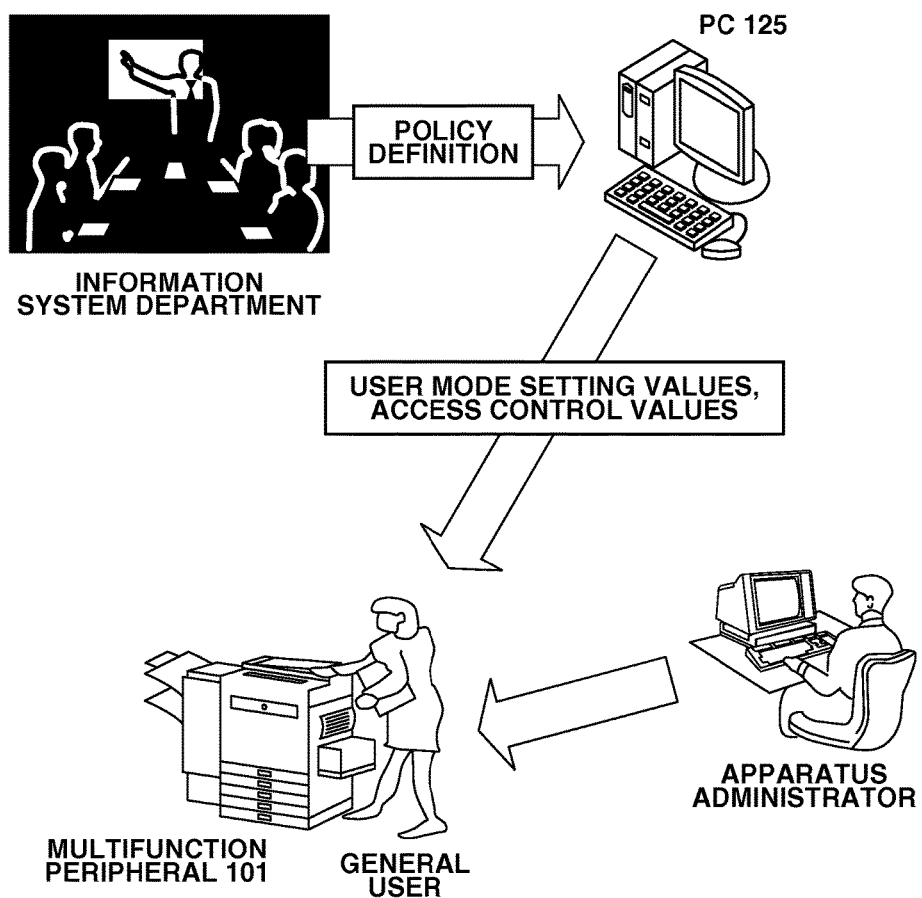
FIG. 1 is a use case diagram of an information processing system according to the present invention.

A first exemplary embodiment of the present invention will be described below. FIG. 1 is a use case diagram for illustrating a configuration of an information processing system according to an exemplary embodiment of the present invention.

In FIG. 1, an information system department defines a security policy for its office. The security policy refers to a security measure standard in an office. For example, the security policy refers to security rules for preventing unintended uses of information, intrusion from outside, and leakage of secrets. Examples of the security rules include who is allowed to read which piece of information, which operation is permitted to whom, and data to be encrypted.

A person in charge (security administrator) in the information system department describes such a security policy (policy definition) according to a predetermined description rule (sets the policy definition as setting values of policy setting items) by using a personal computer (PC) 125 which is an example of an information processing apparatus. The PC 125 then generates user mode forced data including user mode setting values and access control values tailored to a multifunction peripheral 101 based on the policy definition. The multifunction peripheral 101 is a function restriction target according to the policy definition. The PC 125 transmits the user mode forced data to the multifunction peripheral 101. A user mode setting value of the multifunction peripheral 101 refers to a value (setting value) of a setting item for determining an operation of the multifunction peripheral 101. An access control value of the multifunction peripheral 101 refers to control information for controlling prohibition of a change of the setting value in the multifunction peripheral 101.

The apparatus including the functions restricted by a policy definition is not limited to the multifunction peripheral 101 which is an example of an image processing apparatus. Other image forming apparatuses (such as a printer and a scanner), personal computers, mobile terminals, home appliances, and other information processing apparatuses are also applicable to the exemplary embodiment.

The multifunction peripheral 101 receives the foregoing user mode forced data from the PC 125, rewrites the values of its own user mode setting items to the values of the user mode setting items included in the user mode forced data, and restricts a change of the values of the user mode setting items depending on the access control values of the user mode setting items included in the user mode forced data. This prevents general users from using the multifunction peripheral 101 in an unauthorized manner against the security policy. An apparatus administrator in the office cannot make a setting of the multifunction peripheral 101 not adhering to the security policy defined by the information system department. Moreover, as for the user mode setting items which are allowed to change according to the access control values, the setting values thereof can be changed. A specific mechanism will be described below.

Figure 2:
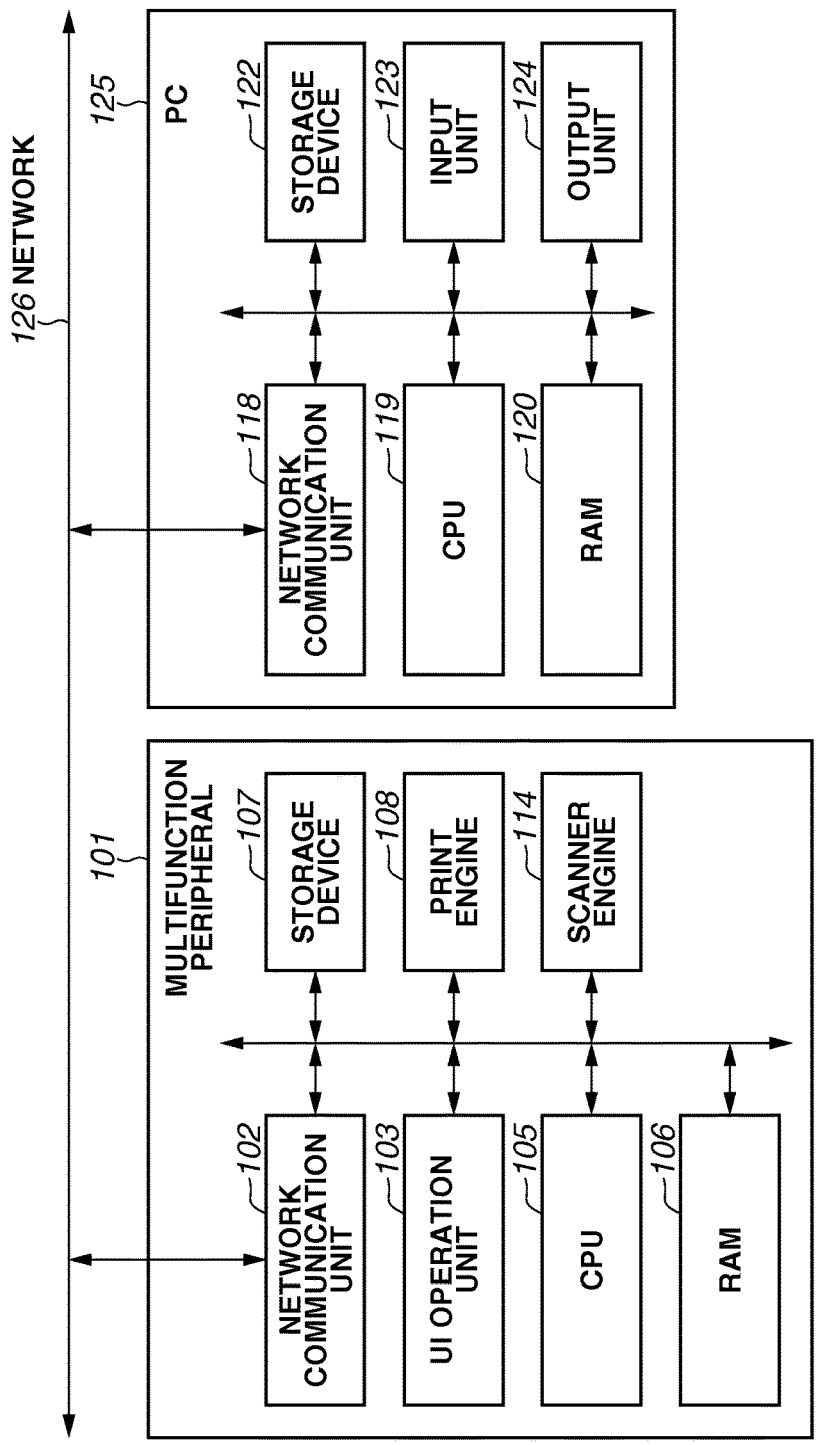
FIG. 2 is a hardware configuration diagram of apparatuses.

FIG. 2 is a block diagram illustrating an outline of a hardware configuration of apparatuses constituting the information processing system which is an exemplary embodiment of the present invention.

As illustrated in FIG. 2, the information processing system according to the present exemplary embodiment includes the multifunction peripheral 101, the PC 125, and a network 126 which connects the multifunction peripheral 101 with the PC 125. The apparatuses constituting the information processing system according to an exemplary embodiment of the present invention are not limited to the illustrated example. A plurality of apparatuses may be connected to the network 126 aside from the illustrated apparatuses.

The multifunction peripheral 101 will initially be described. A network communication unit 102 communicates with an external apparatus (for example, the PC 125) via the network 126. A user interface (UI) operation unit 103 accepts settings to be made to the multifunction peripheral 101, displays a state of the multifunction peripheral 101, and enables a user's operations.

A central processing unit (CPU) 105 performs image processing of print data and various controls. A storage device 107 stores program code and image data. Examples of the storage device 107 include a hard disk drive (HDD) and a solid state drive (SSD). A random access memory (RAM) 106 temporarily stores information such as program code for the CPU 105 to execute, or image data. The CPU 105 loads the program code stored in the storage device 107 into the RAM 106 and executes the program code to realize various controls in the multifunction peripheral 101.

A print engine 108 prints image data on an actual sheet medium by using a conventional technique such as an electrophotographic technique or an inkjet technique. A scanner engine 114 optically reads an image printed on a sheet medium.

In the foregoing configuration, a copy function of the multifunction peripheral 101 is realized in the following manner.

The CPU 105, triggered by an operation performed on the UI operation unit 103, reads image data from the scanner engine 114 according to the program code stored in the RAM 106. The read image data is taken into the storage device 107, subjected to necessary image processing, and output by the print engine 108.

Next, the PC 125 will be described. A network communication unit 118 communicates with an external apparatus via the network 126. A CPU 119 performs various controls. A RAM 120 temporarily stores information such as program code for the CPU 119 to execute. A storage device 122 stores program code and data. Examples of the storage device 122 include a HDD and an SSD. The CPU 119 loads the program code stored in the storage device 122 into the RAM 120 and executes the program code to realize various controls in the PC 125. An input unit 123 accepts the administrator's input to the PC 125. Examples of the input unit 123 include a keyboard and a pointing device. An output unit 124 is, for example, a display.

Figure 3A:
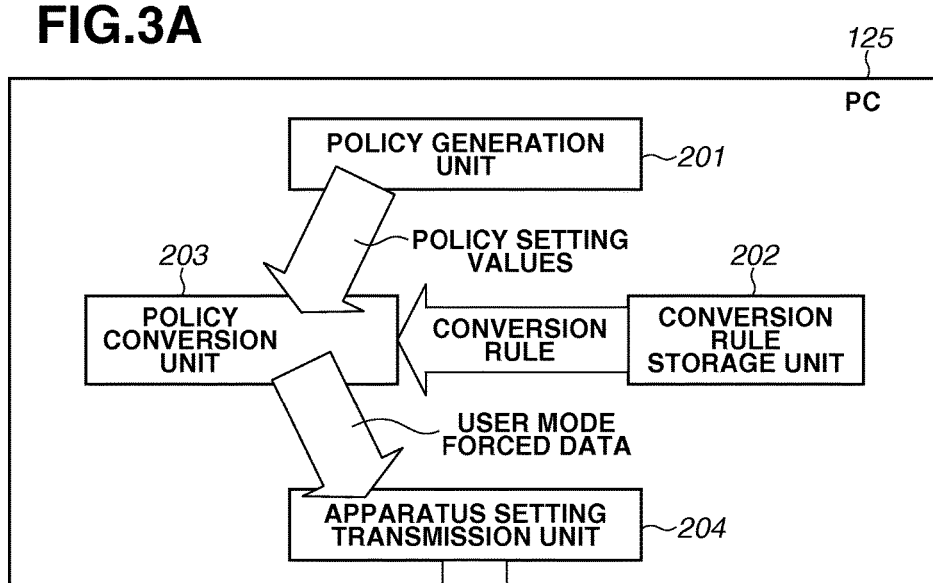
FIGS. 3A and 3B are functional configuration diagrams related to control of a security policy according to a first exemplary embodiment.
Figure 3B:
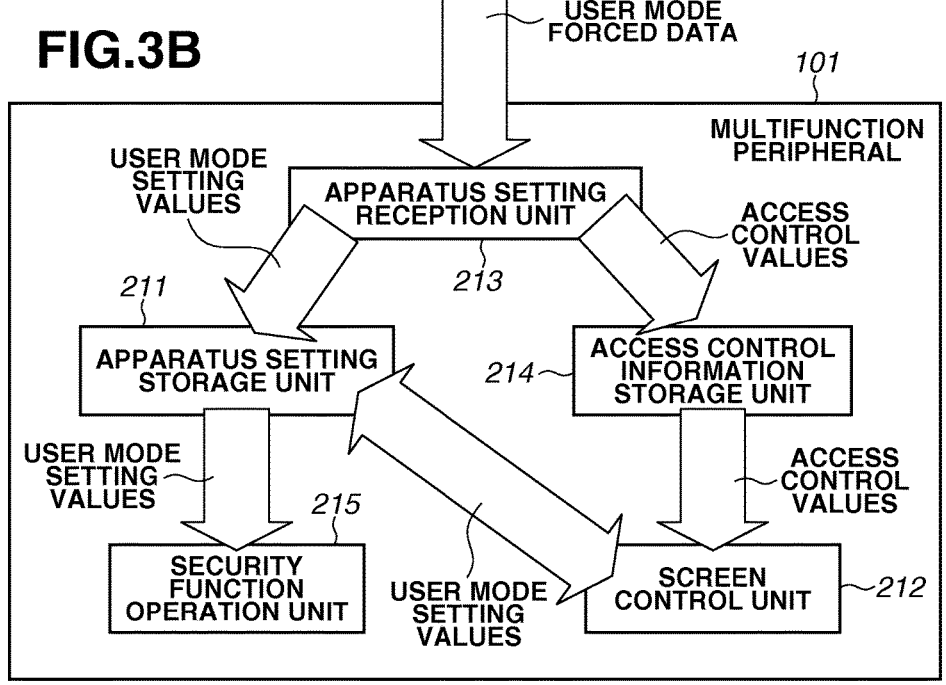

FIGS. 3A and 3B are block diagrams illustrating a general configuration of functions related to control of a security policy in the PC 125 and the multifunction peripheral 101 according to the first exemplary embodiment.

FIG. 3A illustrates a general configuration of the functions related to the control of a security policy in the PC 125. FIG. 3B illustrates a general configuration of the functions related to the control of a security policy in the multifunction peripheral 101.

The functional units of the PC 125 illustrated in FIG. 3A are realized by the CPU 119 of the PC 125 loading the program code stored in the storage device 122 into the RAM 120 and executing the program code. The functional units of the multifunction peripheral 101 illustrated in FIG. 3B are realized by the CPU 105 of the multifunction peripheral 101 loading the program code stored in the storage device 107 into the RAM 106 and executing the program code. According to the present exemplary embodiment, the functions which are constituted by the software are thus described. However, such functions may be constituted by hardware devices.

In the PC 125 illustrated in FIG. 3A, a policy generation unit 201 accepts actual setting instructions about a security policy to restrict the functions of the multifunction peripheral 101 from the person in charge in the information system department. The policy generation unit 201 then generates setting values (policy setting values) of policy setting items according to the instructions. Although not illustrated in the diagram, the policy generation unit 201 includes a designation unit that designates an apparatus which is a function restriction target according to the set security policy. Here the multifunction peripheral 101 is designated as an example. When designating the target apparatus, the designation unit may also designate a model of the designated apparatus. The designation unit may obtain the model of the designated apparatus from the apparatus. A conversion rule storage unit 202 stores a policy conversion rule that represents a correspondence relationship between the setting values of the policy setting items that can be set by the policy generation unit 201 and the setting values of one or more user mode setting items of the target apparatus to be policy-controlled. For example, the conversion rule storage unit 202 stores the policy conversion rule in the storage device 122. A policy conversion unit 203 converts the policy setting values generated by the policy generation unit 201 into the setting values and the access control values of the user mode setting items of the target apparatus according to the policy conversion rule stored in the conversion rule storage unit 202. The policy conversion unit 203 thereby generates user mode forced data. An apparatus setting transmission unit 204 transmits the user mode forced data generated by the policy conversion unit 203 to the multifunction peripheral 101.

The conversion rule storage unit 202 may store a plurality of policy conversion rules. For example, the conversion rule storage unit 202 may store a policy conversion rule for each model of the apparatus which is the function restriction target by the security policy. The policy conversion unit 203 then may be configured to select and use a corresponding policy conversion rule according to the model of the target apparatus and generate the user mode forced data.

In the multifunction peripheral 101 illustrated in FIG. 3B, an apparatus setting storage unit 211 stores the values of the user mode setting items. For example, the apparatus setting storage unit 211 stores the values of the user mode setting items in the storage device 107. A screen control unit 212 performs screen control to set values into the user mode setting items. An apparatus setting reception unit 213 receives the user mode forced data transmitted from the apparatus setting transmission unit 204 of the PC 125. An access control information storage unit 214 stores information (access control values) for the screen control unit 212 to control prohibition/permission of a change of the setting values at the time of user mode setting. For example, the access control information storage unit 214 stores the access control values in the storage device 107. The screen control unit 212 controls the prohibition/permission of a change of the values of the user mode setting items based on the access control values stored in the access control information storage unit 214. A security function operation unit 215 performs a security function operation of the apparatus according to the values of the user mode setting items stored in the apparatus setting storage unit 211.

The apparatus setting storage unit 211 and the access control information storage unit 214 are information that is physically placed and permanently stored in the storage device 107. The apparatus setting storage unit 211 and the access control information storage unit 214 may exist as an identical storage unit.

The security function operation unit 215 is actually defined as a plurality of functions including a network function and an authentication function.

Figure 4:
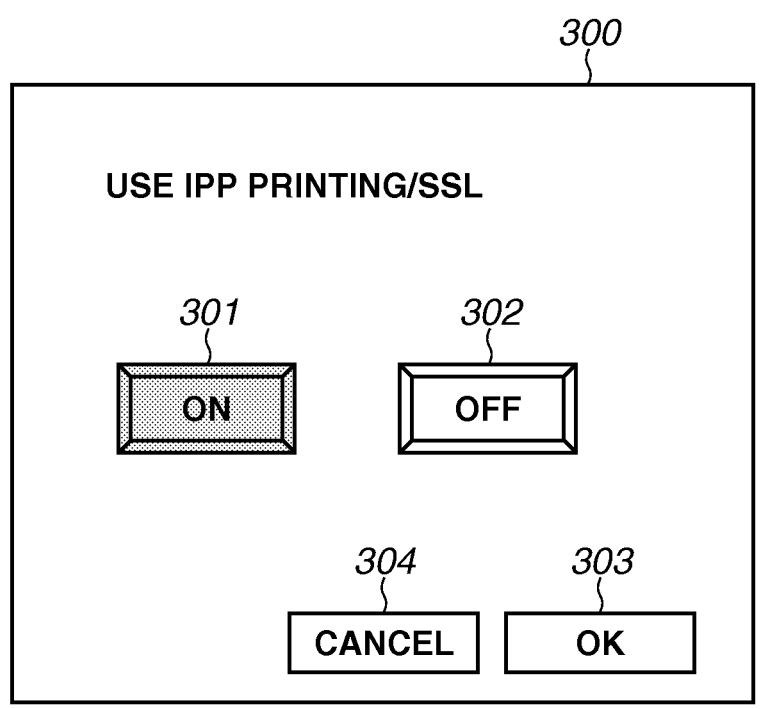
FIG. 4 illustrates a user interface screen which a screen control unit displays and controls.

FIG. 4 is a UI diagram illustrating an example of a user interface screen which the screen control unit 212 displays and controls.

In FIG. 4, an entire screen 300 indicates that the present setting is a user mode setting item "use Internet Printing Protocol (IPP) printing/Secure Socket Layer (SSL)." Values of this user mode setting item include an ON state which can be selected via an ON button 301, and an OFF state which can be selected via an OFF button 302.

In the example of FIG. 4, the ON button 301 is pressed. This indicates that the user mode setting item is set to ON.

On the user interface screen (setting screen) illustrated in FIG. 4, the user can change the value of the user mode setting item by using the ON button 301 or the OFF button 302, and then press an OK button 303 to reflect the setting change. A cancel button 304 terminates the setting screen without reflecting a setting change.

FIG. 5 is a diagram illustrating an example of a logical structure of the apparatus setting storage unit 211.

As an example, FIG. 5 illustrates five security-related user mode setting items and setting values thereof. However, the present invention is not limited thereto.

A user mode setting item 410 "use IPP printing/SSL" sets whether to perform communication by using SSL to prevent wiretapping or tampering with the communication path during a print operation using IPP (defined in Request for Comments (RFC) 2565).

A user mode setting item 411 "use Simple Mail Transfer Protocol (SMTP)/SSL" sets whether to perform communication by using SSL to prevent wiretapping or tampering with the communication path during mail transmission using SMTP.

A user mode setting item 412 "use SSL communication with high encryption strength" sets whether to limit the encryption system used in SSL to one having high strength (for example, strong encryption defined in the National Institute of Standards and Technology (NIST) Special Publication (SP) 800-57).

A user mode setting item 413 "use Internet Protocol Security (IPsec) with high encryption strength" sets whether to limit the encryption system to one having high strength (ditto) when encrypting the Internet Protocol (IP) layer by using IPsec. A user mode setting item 414 "use user authentication" sets whether user authentication needs to be performed when using the multifunction peripheral 101.

A user mode setting item 415 "limit characters for user authentication/password" sets whether to limit characters that the user can use to set a password (for example, use at least one numeral, one uppercase alphabetic character, and one lowercase alphabetic character) if user authentication is performed before using the multifunction peripheral 101.

In such a manner, in the multifunction peripheral 101, the apparatus setting storage unit 211 stores the setting values of the security-related user mode setting items according to the respective functions. In the multifunction peripheral 101, the access control information storage unit 214 further stores the access control values about the respective user mode setting items. A description thereof will be given below with reference to FIG. 6.

FIG. 6 is a table illustrating a logical structure of the access control information storage unit 214.

As illustrated in FIG. 6, the access control information storage unit 214 stores access control values 1110 to 1115 about the user mode setting items 410 to 415 similar to those illustrated in FIG. 5. The access control values 1110 to 1115 indicate whether the values of the user mode setting items 410 to 415 are changeable, respectively. A user mode setting item having an access control value "ON" can be controlled so as not to be changeable. A user mode setting item having an access control value "OFF" can be controlled so as to be changeable.

Next, an example of actually setting a policy will be described.

Figure 7:
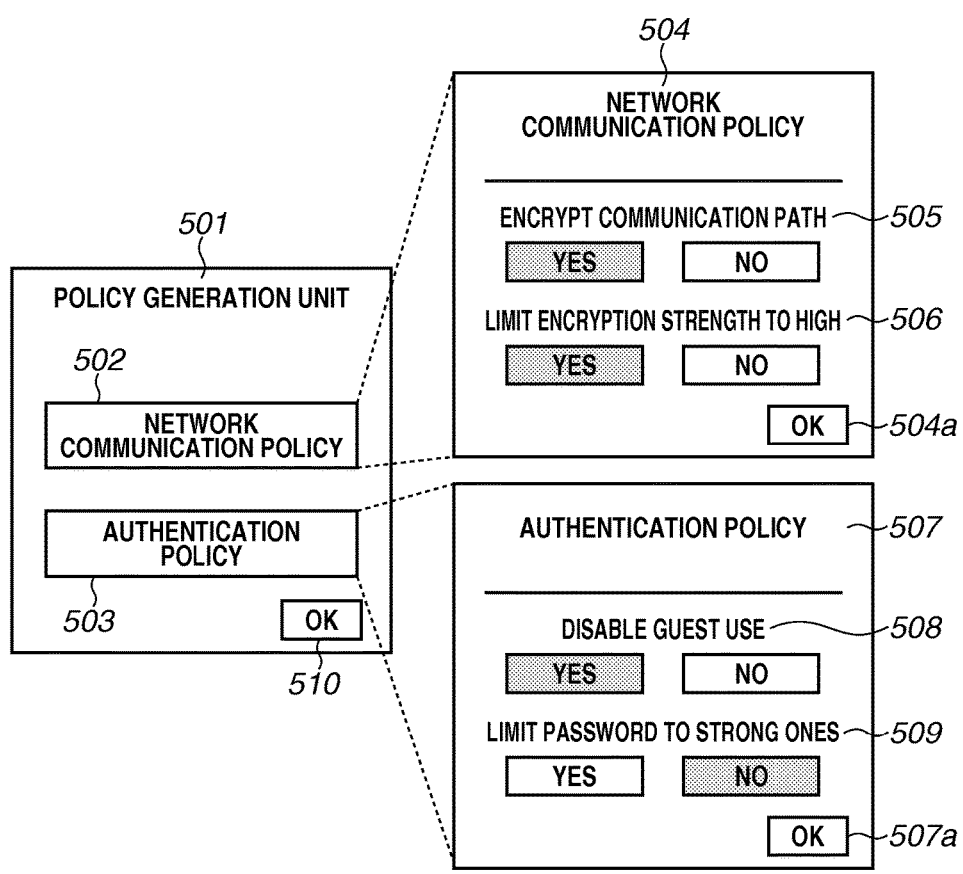
FIG. 7 illustrates a user interface screen of a policy generation unit according to the first exemplary embodiment.

FIG. 7 is a diagram illustrating an example of a user interface screen of the policy generation unit 201 on the PC 125 side according to the first exemplary embodiment.

FIG. 7 illustrates a top screen 501 of screens for setting a security policy. The top screen 501 is displayed on the output unit 124 if the person in charge in the information system department runs an application program for setting a security policy on the PC 125 by operating the input unit 123.

If the person in charge presses a network communication policy button 502 on the top screen 501, the top screen 501 transitions to a detailed setting screen 504 about a network communication policy. If the person in charge presses an authentication policy button 503 on the top screen 501, the top screen 501 transitions to a detailed setting screen 507 about an authentication policy.

On the detailed setting screen 504 about a network communication policy, the person in charge can select a security policy setting "encrypt the communication path" by using a setting section 505. The person in charge can select a security policy setting "limit encryption to strong ones" by using a setting section 506. If the person in charge presses an OK button 504*a*, the detailed setting screen 504 returns to the top screen 501.

On the detailed setting screen 507 about an authentication policy, the person in charge can select a security policy setting "disable guest use" by using a setting section 508. The person in charge can select a security policy setting "limit a password to strong ones" by using a setting section 509. If the person in charge presses an OK button 507*a*, the detailed setting screen 507 returns to the top screen 501.

After the settings about the network communication policy and the settings about the authentication policy are made as described above, if the person in charge presses an OK button 510 on the top screen 501, the settings of the security policy are fixed (in other words, policy setting values are generated) by each of the functional units illustrated in FIG. 3A. User mode forced data is generated based on the fixed settings of the security policy.

FIGS. 8A and 8B are diagrams illustrating an example of the policy conversion rule about the security policy setting items and the related user mode setting items according to the first exemplary embodiment, stored in the conversion rule storage device 202, as a logical structure.

FIG. 8A is a table illustrating an example of a relationship between the values (policy setting values) of the setting items that can be set on the detailed setting screen 504 about the network communication policy illustrated in FIG. 7 and the values (user mode setting values) of the user mode setting items.

In FIG. 8A, the horizontal axis shows "yes" or "no", each of which is the setting value of the setting items of "encrypt the communication path" and "limit encryption to strong ones" of the network communication policy. User mode setting items affected by the settings are listed with methods for forcing and easing. Unaffected user mode setting items are listed with "–".

For example, FIG. 8A illustrates that the user mode setting item "use IPP printing/SSL" is affected by the security policy setting item "encrypt the communication path." The policy conversion rule is described such that if the security policy setting item is set to "yes," the value of the user mode setting item (in the diagram, represented by "value") is set to ON (value=ON) and the access control setting value (in the diagram, represented by "control") is set to ON (control=ON).

On the other hand, the policy conversion rule is described such that if the security policy setting item is set to "no," the access control setting value is set to OFF (control=OFF).

The same holds for the other user mode setting items.

FIG. 8B is a diagram illustrating an example of a relationship between the values (policy setting values) of the setting items that can be set on the detailed setting screen 507 about the authentication policy illustrated in FIG. 7 and the values (user mode setting values) of the user mode setting items. The user mode setting items are listed in a manner similar to that of FIG. 8A.

In the PC 125, the policy generation unit 201 receives the setting of the setting values of the individual setting items of the security policy. The policy conversion unit 203 then converts each of the set policy setting values into the setting value and access control value of one or more user mode setting items based on the policy conversion rule stored in the conversion rule storage unit 202. Thus, the policy conversion unit 203 generates data about a user mode to be forced (user mode forced data). The apparatus setting transmission unit 204 then transmits the generated user mode forced data to the multifunction peripheral 101.

Figure 9:
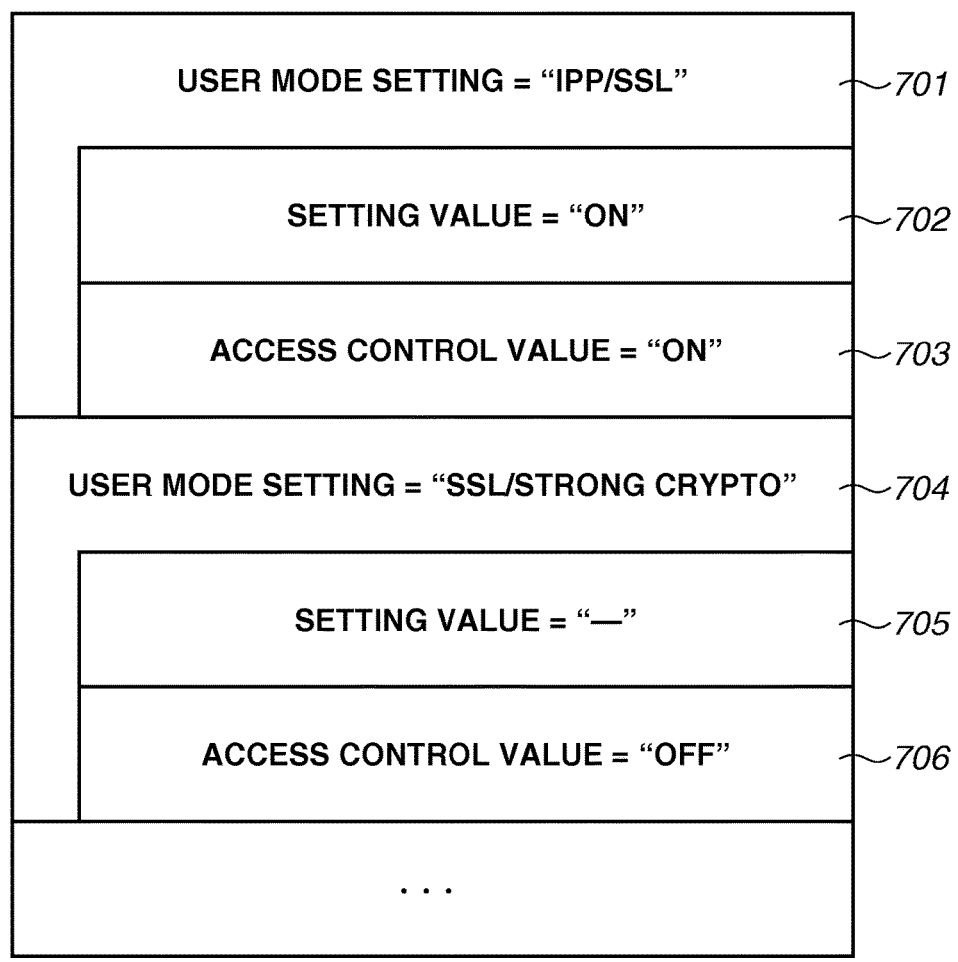
FIG. 9 is a schematic diagram illustrating an example of a format of user mode forced data according to the first exemplary embodiment.

FIG. 9 is a schematic diagram illustrating an example of a format of the user mode forced data according to the first exemplary embodiment.

The user mode forced data has a simple list structure in which a user mode setting item value and an access control value of the individual user mode setting items to be forced or eased are listed item by item. The user mode forced data may have a comma-separated values (CSV) structure in which character strings are separated by separators, or an extensible markup language (XML) structure having a predetermined format.

In FIG. 9, a user mode setting item 701 has a keyword "IPP/SSL" which represents the user mode setting item 410 "use IPP printing/SSL" illustrated in FIG. 5. A setting value 702 indicates that the setting value of this user mode setting item 701 is set to "ON." An access control value 703 indicates that access control is "ON" and that the access to this user mode setting item 701 is controlled so as to prohibit operation (prohibit a setting change) of the user mode setting item 701.

Similarly, a user mode setting item 704 has a keyword "SSL/STRONG CRYPTO" which represents the user mode setting item 412 "use SSL communication with high encryption strength" in FIG. 5. A setting value 705 "–" indicates that there is no value to force the user mode setting item 704. An access control value 706 indicates that access control is OFF and that the access control on the user mode setting item 704 is cancelled to make the user mode setting item 704 operable (changeable in setting).

Although not illustrated in FIG. 9, authentication information about the security administrator who set the security policy based on which the user mode forced data is generated may be added to the user mode forced data.

Figure 10:
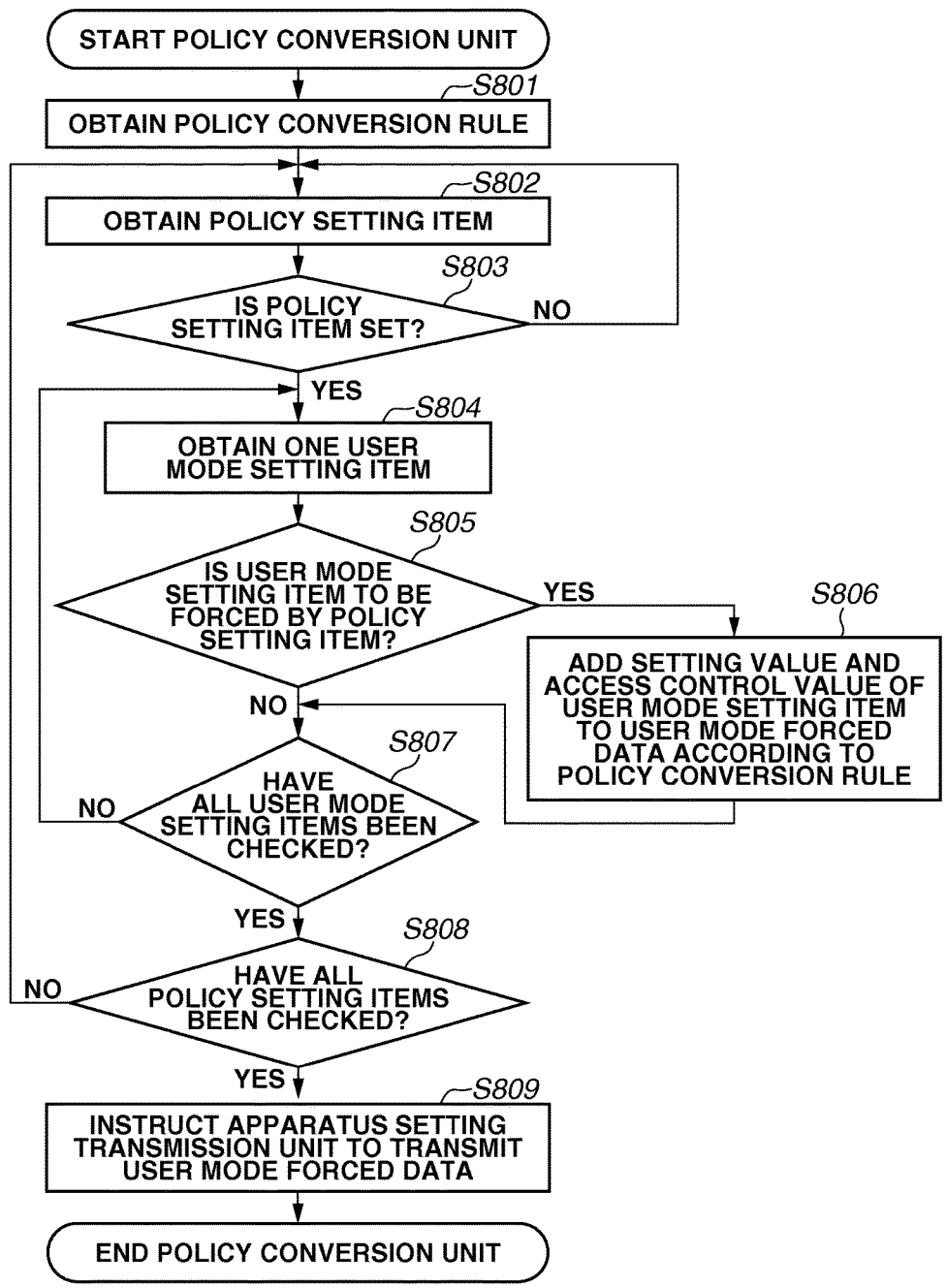
FIG. 10 is a flowchart for describing an operation of a policy conversion unit.

FIG. 10 is a flowchart for describing an operation of the policy conversion unit 203. Specifically, the processing illustrated in this flowchart is realized by the CPU 119 of the PC 125 loading the program code stored in the storage unit 122 into the RAM 120 and executing the program code. The policy conversion unit 203 is called by the policy generation unit 201. The policy conversion unit 203 is called when the user presses the OK button 510 of the policy generation unit 201, and starts the processing illustrated in this flowchart.

In step S801, the policy conversion unit 203 obtains the policy conversion rule from the conversion rule storage unit 202. In step S802, the policy conversion unit 203 obtains one security policy setting item (hereinafter, policy setting item) that the policy generation unit 201 can set.

In step S803, the policy conversion unit 203 checks and determines whether the policy setting item obtained in the foregoing step S802 is set by the policy generation unit 201. If the policy setting item is determined not to be set (NO in step S803), the processing returns to step S802. In step S802, the policy conversion unit 203 obtains a next policy setting item. On the other hand, if the policy setting item is determined to be set (YES in step S803), the processing proceeds to step S804.

In step S804, the policy conversion unit 203 obtains one user mode setting item from the policy conversion rule stored in the conversion rule storage unit 202. The processing proceeds to step S805. In step S805, the policy conversion unit 203 checks and determines whether the user mode setting item obtained in the foregoing step S804 is to be forced by the policy setting item obtained in the foregoing step S802.

If it is determined that the user mode setting item is forced by the policy setting item (YES in step S805), the processing proceeds to step S806. In step S806, the policy conversion unit 203 adds the setting value and the access control value of the user mode setting item to the user mode forced data according to the policy conversion rule. The processing proceeds to step S807.

On the other hand, if it is determined that the user mode setting item is not forced by the policy setting item (NO in step S805), the processing simply proceeds to step S807.

In step S807, the policy conversion unit 203 determines whether all the user mode setting items have been checked regarding whether to be forced by the policy setting item. If it is determined that all the user mode setting items have not been checked regarding whether to be forced (NO in step S807), the processing returns to step S804. In step S804, the policy conversion unit 203 proceeds to process the next user mode setting item.

On the other hand, if the policy conversion unit 203 determines that all the user mode setting items have been checked regarding whether to be forced (YES in step S807), the processing proceeds to step S808.

In step S808, the policy conversion unit 203 determines whether all the policy setting items have been checked regarding whether to be forced. If it is determined that all the policy setting items have not been checked regarding whether to be forced (NO in step S808), the processing returns to step S802. In step S802, the policy conversion unit 203 proceeds to process the next policy setting item.

On the other hand, if the policy conversion unit 203 determines that all the policy setting items have been checked regarding whether to be forced (YES in step S808), the processing proceeds to step S809.

In step S809, the policy conversion unit 203 instructs the apparatus setting transmission unit 204 to transmit the user mode forced data generated by the foregoing processing to the target apparatus. The policy conversion unit 203 thereby completes the operation.

Upon receiving the instruction, the apparatus setting transmission unit 204 transmits the user mode forced data generated by the policy conversion unit 203 to the apparatus setting reception unit 213 of the multifunction peripheral 101 by using a predetermined communication method. The communication method is not particularly limited. Any method using the Hypertext Transfer Protocol (HTTP) or a common protocol for transmitting a file may be used.

Next, an operation of the multifunction peripheral 101 will be described.

Figure 11:
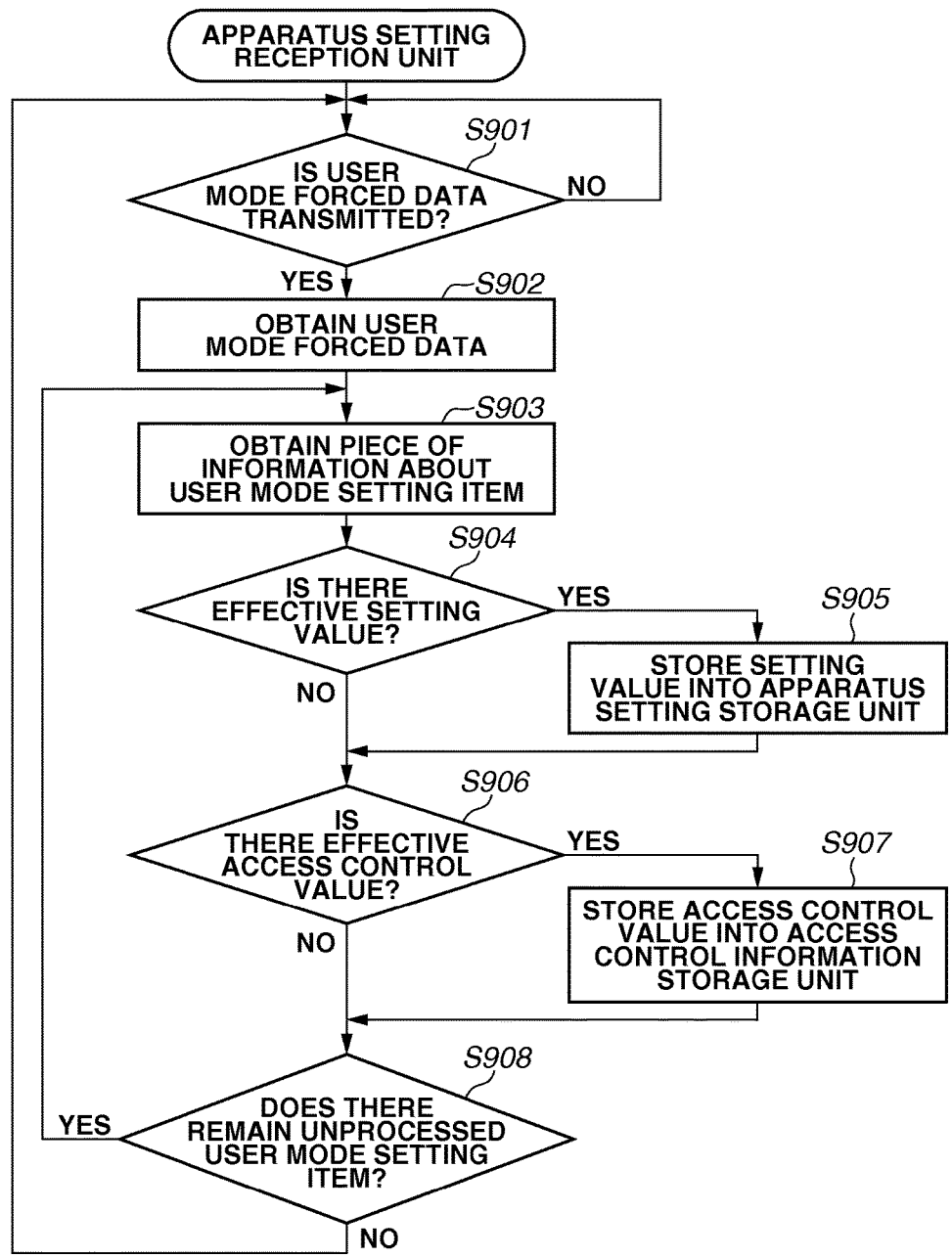
FIG. 11 is a flowchart for describing an operation of an apparatus setting reception unit according to the first exemplary embodiment.

FIG. 11 is a flowchart for describing an operation of the apparatus setting reception unit 213 according to the first exemplary embodiment. More specifically, the processing illustrated in this flowchart is realized by the CPU 105 of the multifunction peripheral 101 loading the program code stored in the storage device 107 into the RAM 106 and executing the program code. The apparatus setting reception unit 213 is activated to start the operation simultaneously with the startup of the multifunction peripheral 101, starts the processing of the flowchart, and subsequently continues the operation until power-off.

In step S901, the apparatus setting reception unit 213 determines whether user mode forced data has been transmitted. If it is determined that user mode forced data has not been transmitted (NO in step S901), then in step S901, the apparatus setting reception unit 213 makes the determination again.

On the other hand, if it is determined that user mode forced data has been transmitted (YES in step S901), the processing proceeds to step S902. In step S902, the apparatus setting reception unit 213 obtains the user mode forced data. The processing proceeds to step S903.

In step S903, the apparatus setting reception unit 213 obtains information about a user mode setting item (for example, the user mode setting item 701 or 704 of FIG. 9). The processing proceeds to step S904. In step S904, the apparatus setting reception unit 213 determines whether there is an effective setting value in the information about the user mode setting item obtained in the foregoing step S903. As employed herein, an effective setting value refers to values other than "–" (for example, the user mode setting item 702 of FIG. 9 has an effective setting value="ON").

If it is determined that there is an effective setting value (YES in step S904), the processing proceeds to step S905. In step S905, the apparatus setting reception unit 213 stores the effective setting value determined in the foregoing step S904 into the apparatus setting storage unit 211. The processing proceeds to step S906.

On the other hand, in the foregoing step S904, if it is determined that there is no effective setting value (NO in step S904), the processing simply proceeds to step S906.

In step S906, the apparatus setting reception unit 213 determines whether there is an effective access control value in the information about the user mode setting item obtained in the foregoing step S903. As employed herein, an effective access control value refers to values other than "–" (for example, the user mode setting item 703 of FIG. 9 has an effective access control value="ON" and the user mode setting item 706 has an effective access control value="OFF").

If it is determined that there is an effective access control value (YES in step S906), the processing proceeds to step S907. In step S907, the apparatus setting reception unit 213 stores the effective access control value determined in the foregoing step S906 into the access control information storage unit 214. The processing proceeds to step S908.

On the other hand, in the foregoing step S906, if it is determined that there is no effective access control value (NO in step S906), the processing simply proceeds to step S908.

In step S908, the apparatus setting reception unit 213 determines whether there remains an unprocessed user mode setting item in the user mode forced data obtained in the foregoing step S902. If it is determined that there is an unprocessed user mode setting item (YES in step S908), the processing returns to step S903. In step S903, the apparatus setting reception unit 213 proceeds to process the next user mode setting item.

On the other hand, if it is determined that there is no unprocessed user mode setting item (NO in step S908), the processing returns to step S901. In step S901, the apparatus setting reception unit 213 waits until next user mode forced data is transmitted.

As described above, the apparatus setting reception unit 213 of the multifunction peripheral 101 performs application processing for applying the user mode forced data. The application processing includes storing (setting) the setting values included in the user mode forced data generated by the PC 125 in the apparatus setting storage unit 211 to enable an operation based on the setting values, and storing the access control values of the setting values included in the user mode forced data in the access control information storage unit 214 to control prohibition of a change of the setting values based on the access control values. When using a function corresponding to the user mode setting items the setting values of which are thus set, an operation is performed with the setting values reflected in the function. The setting values are thereby reflected in the control of each function to be protected by the security policy. Moreover, setting the access control values of the user mode setting items prevents the user mode setting items from being changed. Next, a control by using the access control values will be described.

Figure 12:
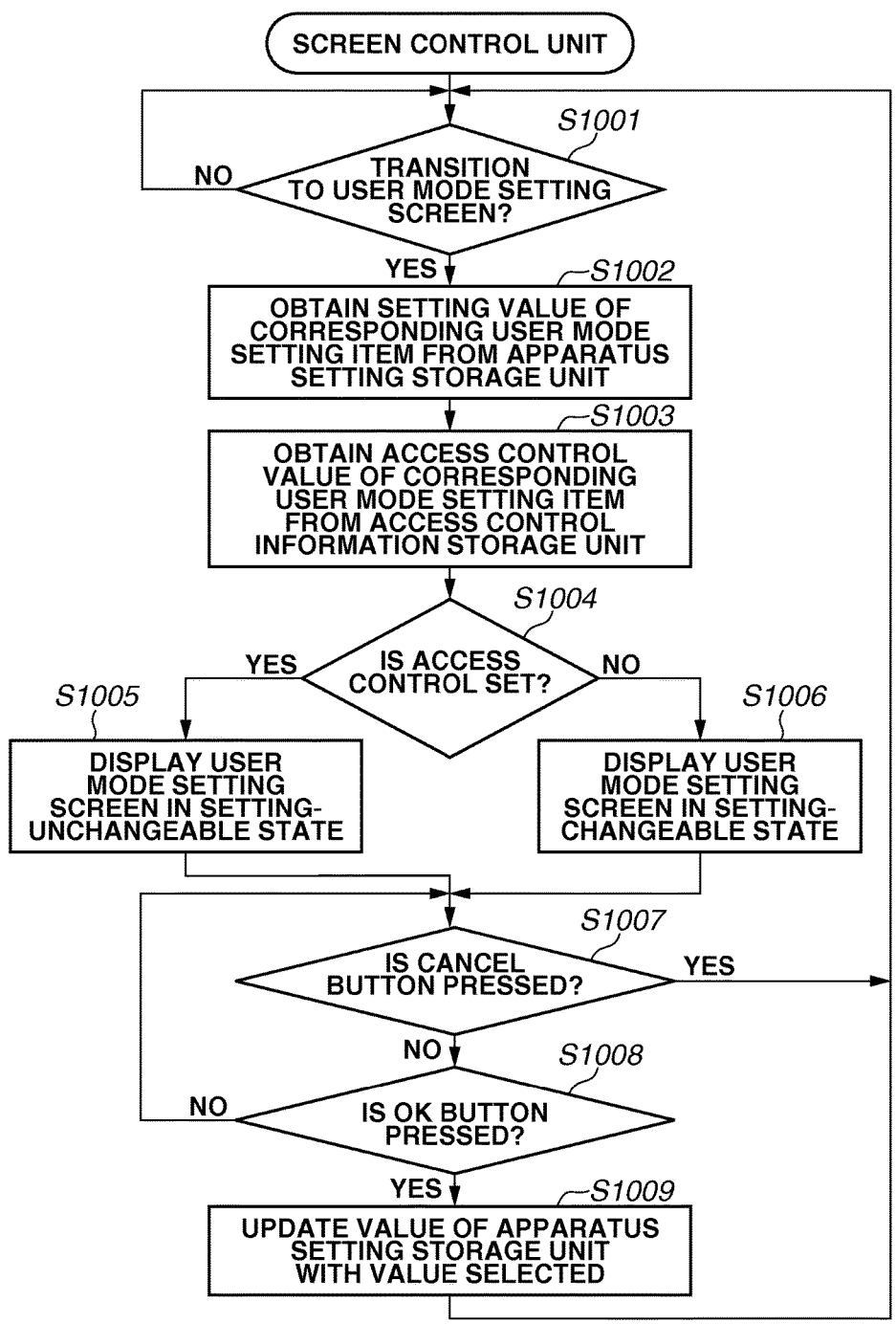
FIG. 12 is a flowchart for describing an operation of the screen control unit.

FIG. 12 is a flowchart for describing an operation of the screen control unit 212. More specifically, the processing illustrated in this flowchart is realized by the CPU 105 of the multifunction peripheral 101 loading the program code stored in the storage device 107 into the RAM 106 and executing the program code. The screen control unit 212 is activated to start the operation simultaneously with the power-on of the multifunction peripheral 101, starts the processing of this flowchart, and subsequently continues the operation until power-off.

In step S1001, the screen control unit 212 determines whether to transition to a setting screen (user mode setting screen) of any one of the user mode setting items in response to an operation from the UI operation unit 103. If the screen control unit 212 determines not to transition to a user mode setting screen (NO in step S1001), then in step S1001, the screen control unit 212 makes the determination again.

On the other hand, if the screen control unit 212 determines to transition to a user mode setting screen (YES in step S1001), the processing proceeds to step S1002.

In step S1002, the screen control unit 212 obtains the setting value of the user mode setting item corresponding to the user mode setting screen to which a transition is made, from the apparatus setting storage unit 211. In step S1003, the screen control unit 212 obtains the access control value of the user mode setting item corresponding to the user mode setting screen to which a transition is made, from the access control information storage unit 214.

In step S1004, the screen control unit 212 determines whether an access control is set (access control value="ON") based on the access control value obtained in the foregoing step S1003. If it is determined that an access control is set (access control value="ON") (YES in step S1004), the processing proceeds to step S1005. In step S1005, the screen control unit 212 displays the user mode setting screen in a setting-unchangeable state (for example, the user mode setting screen is displayed as illustrated FIG. 13 to be described below).

On the other hand, in the foregoing step S1004, if it is determined that an access control is not set (access control value="OFF") (NO in step S1004), the processing proceeds to step S1006. In step S1006, the screen control unit 212 displays the user mode setting screen in a setting-changeable state (for example, the user mode setting screen is displayed as illustrated FIG. 4).

After the user mode setting screen is displayed in the foregoing step S1005 or S1006, then in step S1007, the screen control unit 212 determines whether a cancel button is pressed on the user mode setting screen. In step S1008, the screen control unit 212 determines whether an OK button is pressed on the user mode setting screen. Such determinations are repeated until the cancel button or the OK button is pressed.

If it is determined that the cancel button has been pressed (YES in step S1007), the processing returns to step S1001.

If it is determined that the OK button has been pressed (YES in step S1008), the processing proceeds to step S1009. In step S1009, the screen control unit 212 updates the value of the apparatus setting storage unit 211 with the value selected on the displayed user mode setting screen. The processing proceeds to step S1001.

Figure 13:
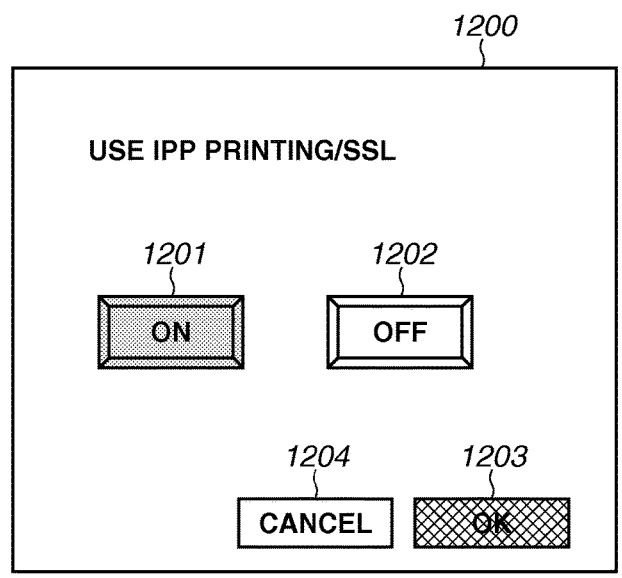
FIG. 13 illustrates a user interface screen in a setting unchangeable state.

FIG. 13 is a UI diagram illustrating an example of a user interface screen that the screen control unit 212 displays when in a setting-unchangeable state.

In FIG. 13, the user interface screen is configured so that an OK button 1203 cannot be pressed, and the setting cannot be changed. In FIG. 12, the processing cannot proceed to step S1009 for a setting change, accordingly. Aside from preventing the OK button 1203 from being pressed, the setting-unchangeable state may also be realized by making a setting value unselectable. The implementation of the setting-unchangeable state is not limited to such methods.

As described above, the PC 125 side generates the user mode forced data including the user mode setting values conforming to the set security policy and the access control values for preventing a change of the user mode setting values. The PC 125 transmits the user mode forced data to the multifunction peripheral 101. The multifunction peripheral 101 side applies the user mode setting values and the access control values based on the user mode forced data to the multifunction peripheral 101, and thus the multifunction peripheral 101 can be prevented from being used against the set security policy.

A second exemplary embodiment of the present invention will be described below. According to the first exemplary embodiment, a single security policy is employed. In practice, the same multifunction peripheral 101 may be used by a plurality of departments. In such a case, the security policy may vary from department to department. The second exemplary embodiment describes a configuration for such a case.

Figure 14:
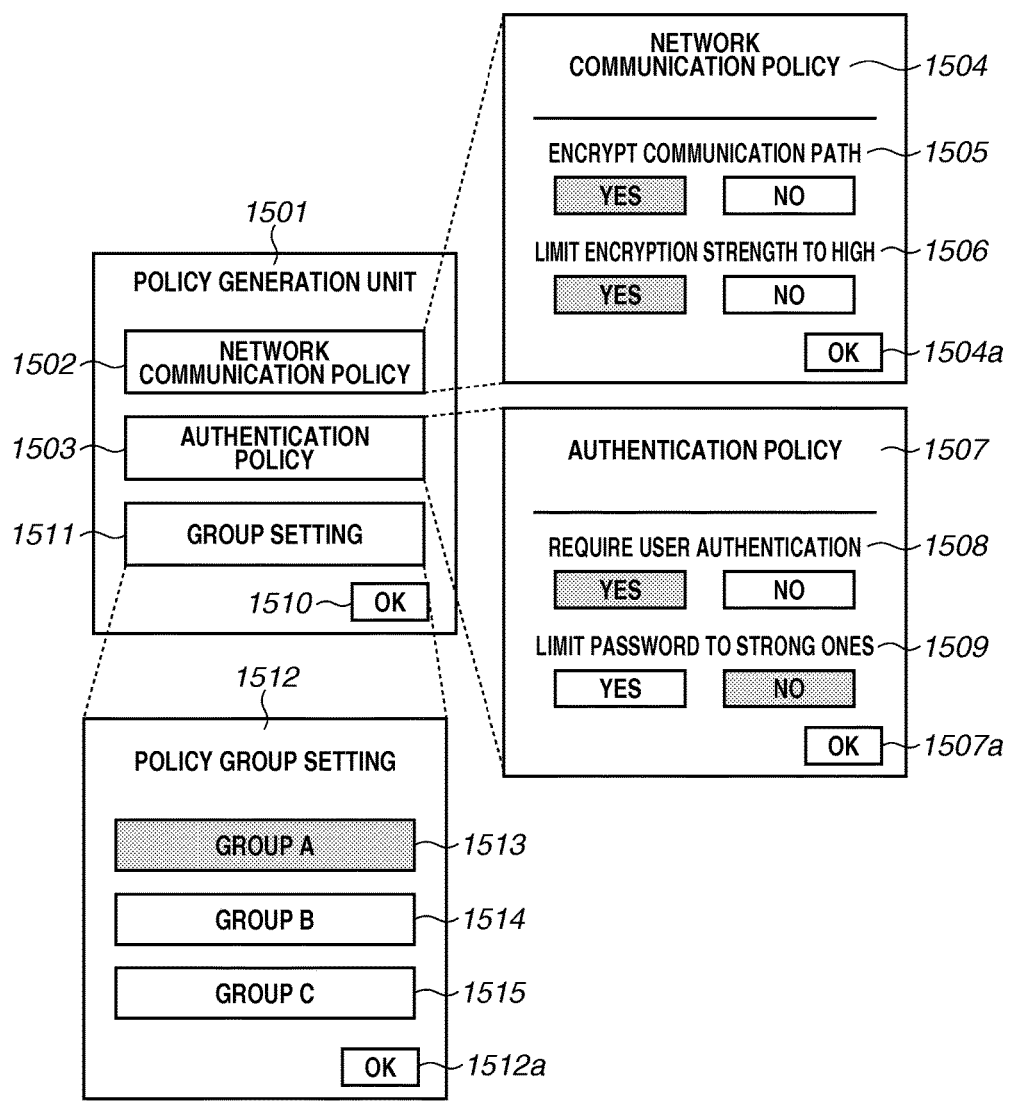
FIG. 14 illustrates a user interface screen of a policy generation unit according to a second exemplary embodiment.

FIG. 14 is a diagram illustrating an example of a user interface screen of the policy generation unit 201 on the PC 125 side according to the second exemplary embodiment. Only differences between FIG. 14 and FIG. 7 will be described.

In FIG. 14, a top screen 1501, a network communication policy button 1502, an authentication policy button 1503, a detailed setting screen 1504, setting sections 1505, 1506, 1508, and 1509, and OK buttons 1504a, 1507a, and 1510 are similar to the top screen 501, the network communication policy button 502, the authentication policy button 503, the detailed setting screen 504, the setting sections 505, 506, 508, and 509, and the OK buttons 504a, 507a, and 510 of FIG. 7, respectively. A description thereof will thus be omitted. A group setting button 1511 sets a group to be linked with a security policy. If the person in charge presses the group setting button 1511, the top screen 1501 transitions to a setting screen 1512 of a policy group, in which the person in charge can select a group to set the security policy.

In the example of the setting screen 1512 of a policy group, a button 1513 indicating "group A" is in a selected state. If an OK button 1512a is pressed in such a state, the setting screen 1512 returns to the top screen 1501. The network communication policy button 1502 and the authentication policy button 1503 serve as buttons for setting the security policy for "group A."

Figure 15:
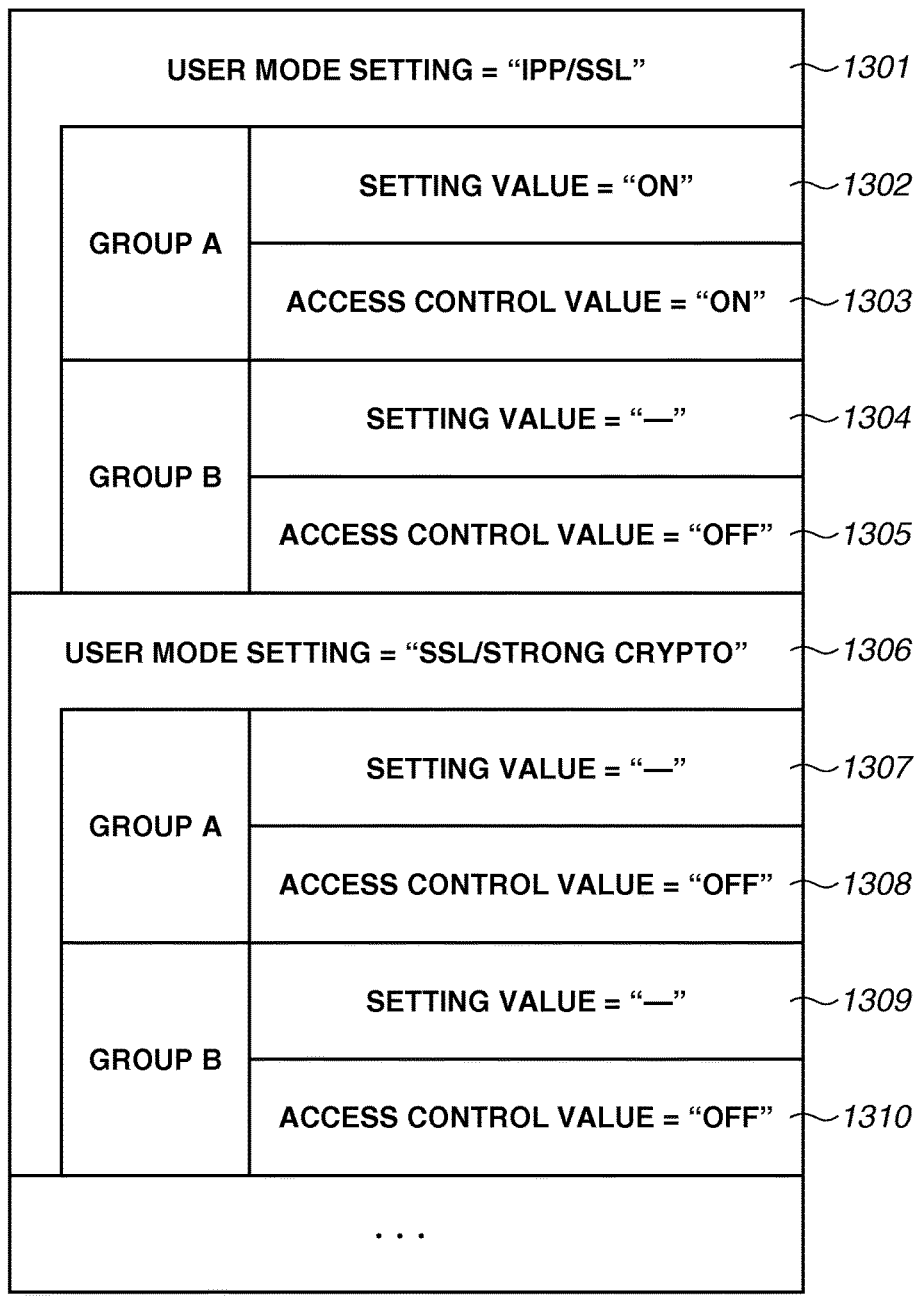
FIG. 15 is a schematic diagram illustrating an example of the format of user mode forced data according to the second exemplary embodiment.

FIG. 15 is a schematic diagram illustrating an example of the format of the user mode forced data according to the second exemplary embodiment. A difference between FIGS. 15 and 9 lies in that the forced settings for the user mode setting values are described in units of groups.

For example, a user mode setting item 1301 regarding "IPP/SSL" includes settings related to "group A" and "group B." For "group A," a setting value 1302 is set to "ON" and an access control value 1303 is set to "ON." For "group B," a setting value 1304 is set to "–" and an access control value 1305 is set to "OFF." In such a manner, according to the second exemplary embodiment, the policy generation side can make policy settings group by group.

Next, a case of applying security policies group by group will be described.

Figure 16A:
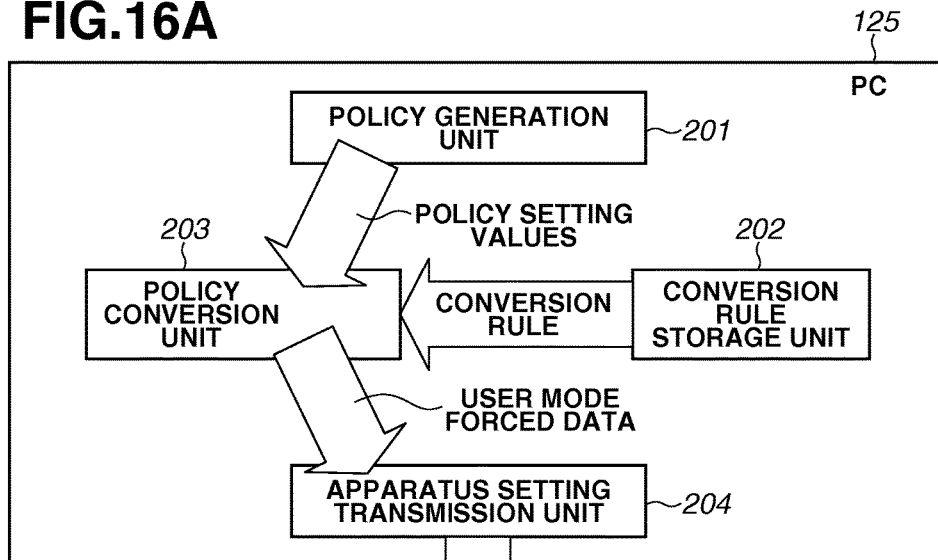
FIGS. 16A and 16B are functional configuration diagrams related to control of security policies according to the second exemplary embodiment.
Figure 16B:
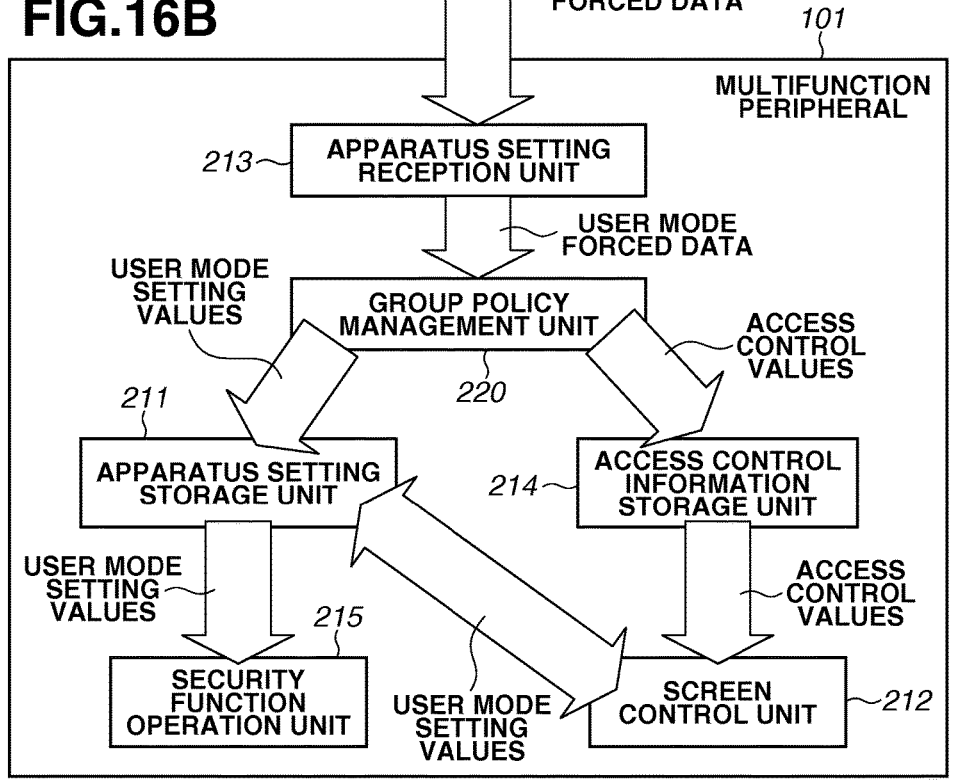

FIGS. 16A and 16B are block diagrams illustrating a general configuration of functions related to the control of the security policies in the PC 125 and the multifunction peripheral 101 according to the second exemplary embodiment. In FIGS. 16A and 16B, parts corresponding to those of FIGS. 3A and 3B are designated by the same reference numerals.

In FIGS. 16A and 16B, a group policy management unit 220 is added to the functions of the multifunction peripheral 101. The group policy management unit 220 is a function realized by the CPU 105 of the multifunction peripheral 101 loading program code stored in the storage device 107 into the RAM 106 and executing the program code.

The policy conversion unit 203 according to the second exemplary embodiment generates user mode forced data such as illustrated in FIG. 15. The apparatus setting reception unit 213 according to the second exemplary embodiment receives the user mode forced data such as illustrated in FIG. 15 and stores the user mode forced data into the storage device 107. In addition, the apparatus setting reception unit 213 according to the second exemplary embodiment does not perform the operation illustrated in FIG. 11.

The group policy management unit 220 obtains the setting values of the user mode setting items and the access control values corresponding to a group attribute of a login user from the user mode forced data obtained from the storage device 107, and stores the setting values and the access control values into the apparatus setting storage unit 211 and the access control information storage unit 214. A description will be given below by using a flowchart.

Figure 17:
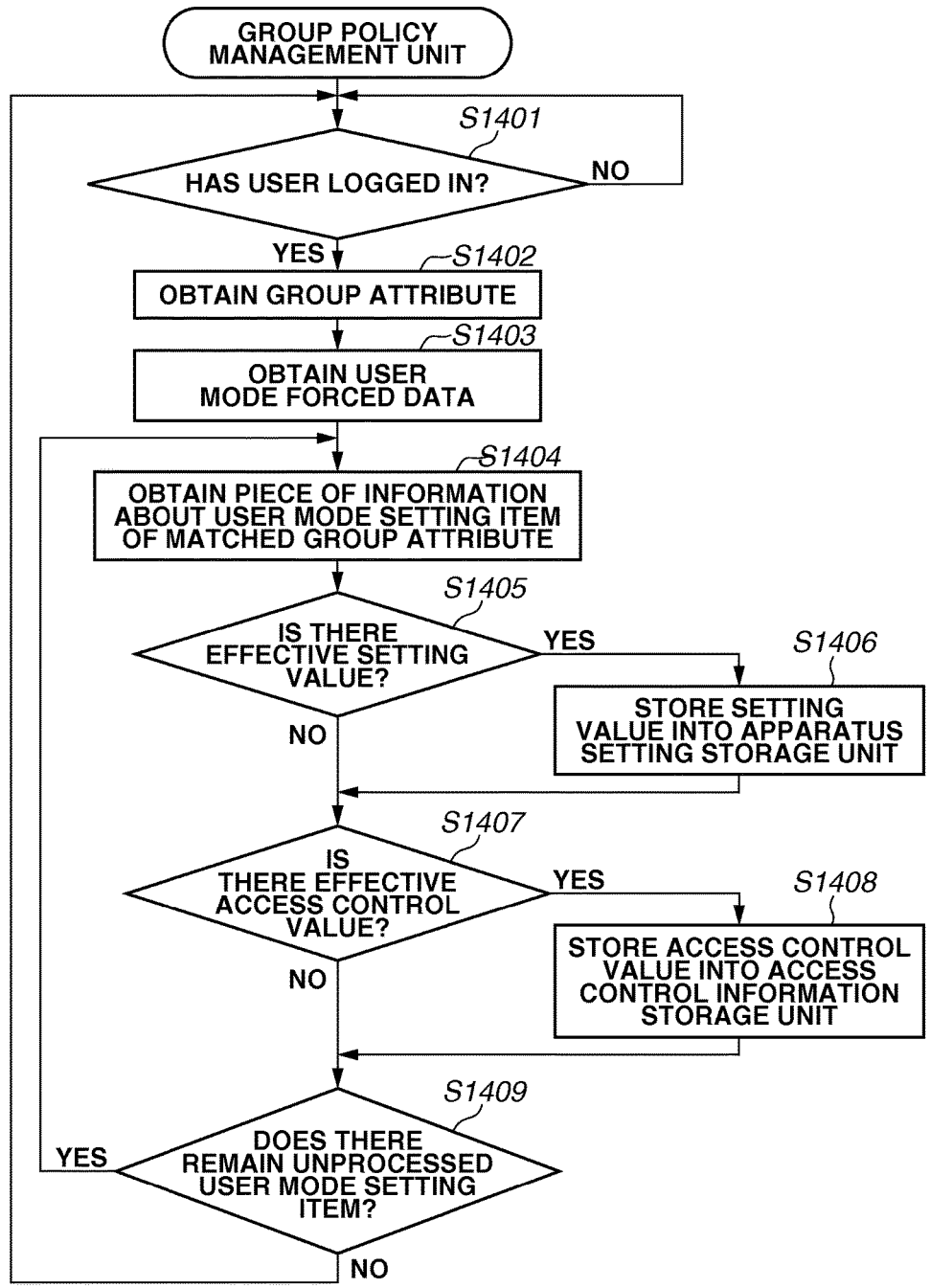
FIG. 17 is a flowchart for describing an operation of a group policy management unit.

FIG. 17 is a flowchart for describing an operation of the group policy management unit 220. More specifically, the processing illustrated in this flowchart is realized by the CPU 105 of the multifunction peripheral 101 loading program code stored in the storage device 107 into the RAM 106 and executing the program code. The group policy management unit 220 is activated to start the operation simultaneously with the startup of the multifunction peripheral 101, starts the processing of this flowchart, and subsequently continues the operation until power-off.

In step S1401, the group policy management unit 220 inquires of a not-illustrated login module to determine whether a user has logged in. If it is determined that no user has logged in (NO in step S1401), then in step S1401, the group policy management unit 220 makes the determination again.

On the other hand, if it is determined that a user has logged in (YES in step S1401), the processing proceeds to step S1402.

In step S1402, the group policy management unit 220 inquires about the group attribute of the user logging-in in the foregoing step S1401. According to the present embodiment, the group attribute has been defined and stored in the storage device 107 when the user has created his/her account.

In step S1403, the group policy management unit 220 obtains user mode forced data. Here, the user mode forced data is used that has been stored in the storage device 107 when the apparatus setting reception unit 213 has received the user mode forced data In step S1404, the group policy management unit 220 obtains a piece of information (for example, the setting value 1302 and the access control value 1303) about a user mode setting item the group attribute of which matches the group attribute obtained in the foregoing step S1402, from the user mode forced data obtained in the foregoing step S1403.

A description will be given of a case where a user belonging to "group A" in the user mode forced data illustrated in FIG. 15 has logged in as an example. For the user mode setting item 1301 "IPP/SSL," the group policy management unit 220 obtains the attribute value 1302 and the access control value 1303. For the user mode setting item 1306 "SSL/STRONG CRYPTO," the group policy management unit 220 obtains the setting value 1307 and the access control value 1308.

In step S1405, the group policy management unit 220 determines whether there is an effective setting value in the information about the user mode setting item obtained in the foregoing step S1404. If it is determined that there is an effective setting value (YES in step S1405), the processing proceeds to step S1406. In step S1406, the group policy management unit 220 stores the effective setting value obtained in the step S1404 into the apparatus setting storage unit 211. The processing proceeds to step S1407.

On the other hand, if it is determined that there is no effective setting value (NO in step S1405), the processing simply proceeds to step S1407.

In step S1407, the group policy management unit 220 determines whether there is an effective access control value in the information about the user mode setting item obtained in the foregoing step S1404. If it is determined that there is an effective access control value (YES in step S1407), the processing proceeds to step S1408. In step S1408, the group policy management unit 220 stores the effective access control value obtained in the step S1408 into the access control information storage unit 214. The processing proceeds to step S1409.

On the other hand, if it is determined that there is no effective access control value (NO in step S1407), the processing simply proceeds to step S1409.

In step S1409, the group policy management unit 220 determines whether there remains an unprocessed user mode setting item in the user mode forced data obtained in the step S1403. If it is determined that there is an unprocessed user mode setting item (YES in step S1409), the processing returns to step S1404. In step S1404, the group policy management unit 220 proceeds to the acquisition of information about the next user mode setting item.

On the other hand, if it is determined that there is no unprocessed user mode setting item (NO in step S1409), the processing returns to step S1401. In step S1401, the group policy management unit 220 waits until a next user logs in.

According to the second exemplary embodiment, when a plurality of different security policies exists, security policies are set group by group in advance according to the concept of each group. At the time of login, the multifunction peripheral 101 identifies the group of the login user and applies the user mode setting values and the access control values corresponding to that group. In such a manner, even if there is a plurality of different security policies, the security policies according to the respective groups can be applied to the multifunction peripheral 101.

In the foregoing description, the group policy management unit 220 is configured to obtain the setting values of the user mode setting items and the access control values corresponding to the group attribute of a login user from the user mode forced data stored in the storage device 107 in response to the login of the user, and store the setting values and the access control values into the apparatus setting storage unit 211 and the access control information storage unit 214.

Instead, the group policy management unit 220 may be configured to previously obtain the setting values of the user mode setting items and the access control values for a group attribute of each user from the user mode forced data, and store the setting values and access control values into the storage device 107. In response to the login of a user, the group policy management unit 220 then obtains the setting values of the user mode setting items and the access control values corresponding to the login user from the storage device 107, and stores the setting values and the access control values into the apparatus setting storage unit 211 and the access control information storage unit 214.

The apparatus setting storage unit 211 and the access control information storage unit 214 may be provided for each group attribute. In such a configuration, the group policy management unit 220 previously obtains the setting values of the user mode setting items and the access control values for a group attribute of each user from the user mode forced data, and stores the setting values and the access control values into the attribute setting storage units 211 and the access control information storage units 214 both of which are provided for each group attribute. The security function operation unit 215 and the screen control unit 212 may be configured to obtain the setting values of the user mode setting items and the access control values from the apparatus setting storage unit 211 and the access control information storage unit 214 corresponding to the login user, and control operations.

The policy conversion unit 203 may generate user mode forced data for each group attribute, and the apparatus setting transmission unit 204 may transmit the generated user mode forced data for each group attribute to the multifunction peripheral 101. In such a configuration, the group policy management unit 220 obtains the user mode forced data corresponding to the group attribute of a login user from the user mode forced data for each group attribute, stored in the storage device 107, in response to the login of the user. The group policy management unit 220 then performs the application processing by using the obtained user mode forced data.

A third exemplary embodiment of the present invention will be described below. In general, there may be a plurality of means for security protection, and any one of the means may satisfactorily realize a security policy. The third exemplary embodiment deals with a restriction in such a case. For example, a communication path can be encrypted by Security Architecture for Internet Protocol (IPsec) which is realized on the network layer of the seven Open Systems Interconnection (OSI) layers, and SSL/Transport Layer Security (TLS) which is realized on the transport layer. If either one can be realized, the purpose of encryption can be achieved.

FIG. 18 is a diagram illustrating an example of a policy conversion rule between policy setting items and related user mode setting items according to the third exemplary embodiment, stored in the conversion rule storage unit 202, as a logical structure.

A difference between FIGS. 18 and 8A lies in that "exclude: IPsec=ON" is added to the rule on two user mode setting items "use IPP printing/SSL" and "use SMTP/SSL" when "encrypt the communication path" of the network communication policy is "yes." This indicates that if IPsec is "ON," the corresponding user mode setting item is excluded from being forced. An operation of the apparatus setting reception unit 213 according to the third exemplary embodiment, corresponding to such an exclusion condition will be described below.

Figure 19:
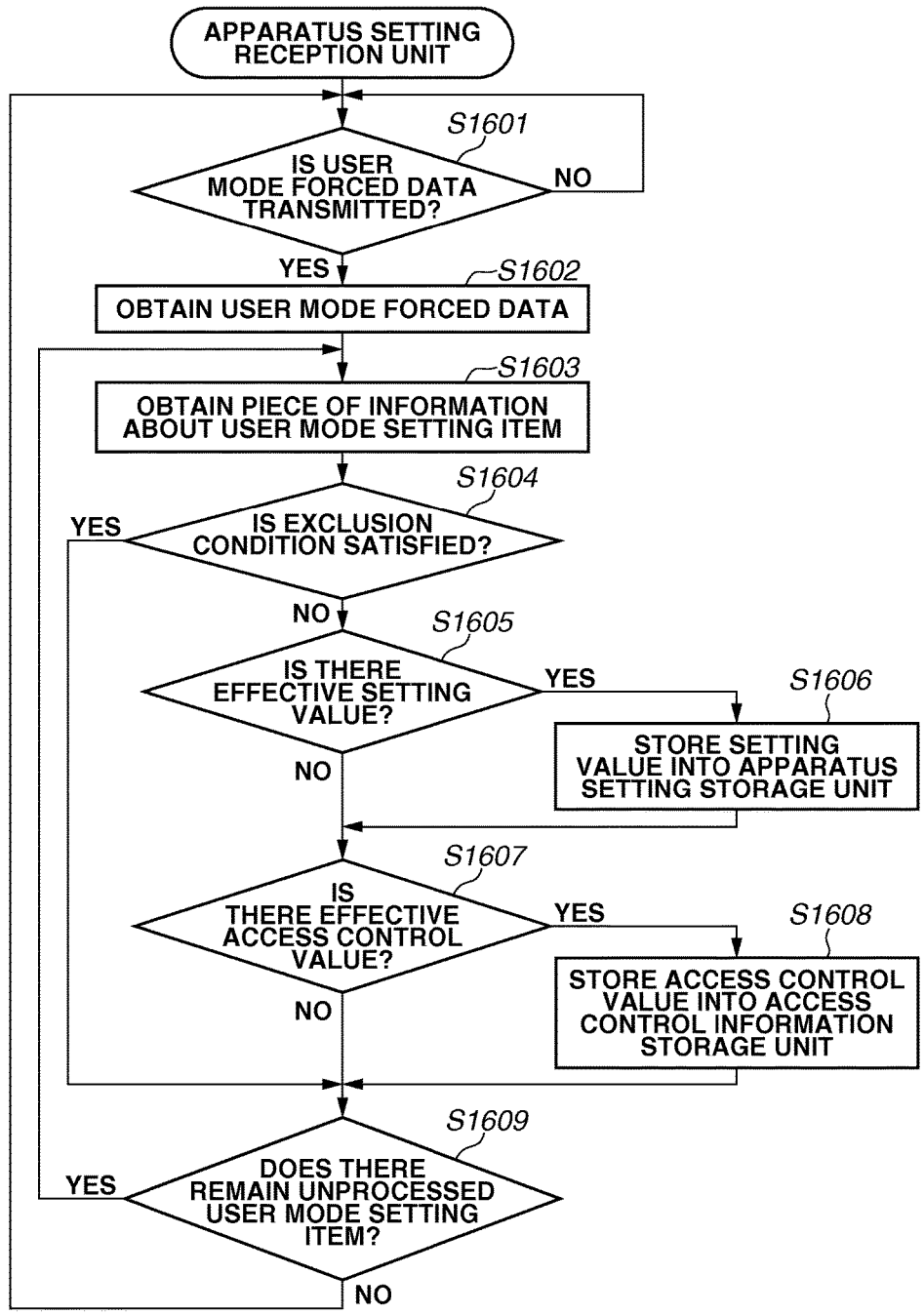
FIG. 19 is a flowchart for describing an operation of an apparatus setting reception unit according to the third exemplary embodiment.

FIG. 19 is a flowchart for describing the operation of the apparatus setting reception unit 213 according to the third exemplary embodiment.

A difference between FIGS. 19 and 11 lies in that whether an exclusion condition is satisfied is checked in step S1604. The processing of steps S1601 to S1603 is similar to that of steps S901 to S903 in FIG. 11. A description thereof will thus be omitted. According to the third exemplary embodiment, in step S1603, the apparatus setting reception unit 213 obtains information about a user mode setting item from the user mode forced data. The processing then proceeds to step S1604.

In step S1604, the apparatus setting reception unit 213 determines whether an exclusion condition included in the user mode setting value obtained in step S1603 is satisfied. For example, when the exclusion condition is "exclude: IPsec=ON", the exclusion condition is satisfied if "value=ON" is set to a user mode setting item="IPsec."

In step S1604, if it is determined that the exclusion condition is satisfied (YES in step S1604), the processing simply proceeds to step S1609. On the other hand, in step S1604, if it is determined that the exclusion condition is not satisfied (NO in step S1604), the processing proceeds to step S1605.

The processing of steps S1605 to S1609 is similar to that of steps S904 to S908 in FIG. 11. A description thereof will thus be omitted.

According to the exclusion condition illustrated in FIG. 18, the determination criterion is whether IPsec is "ON." If the setting value of the policy setting item "encrypt the communication path" of the network communication policy is set to "yes," the setting of the IPP printing/SSL needs to be forcefully set to "ON" for access control. However, if IPsec has been already in use, the exclusion condition is satisfied, in which case the user mode setting item "use IPP printing/SSL" does not need to be changed. Similarly, it becomes unnecessary to change the user mode setting item "use SMTP/SSL".

According to the third exemplary embodiment, in a case where there is a plurality of security-related user mode setting items for realizing a security policy and if the security policy can be realized only by setting any one of the user mode setting items, any one of the user mode setting items may be set alone. Thus, the administrator's degree of freedom can be increased in setting user modes.

As described above, according to the present invention, the PC 125 side transmits the user mode forced data to an apparatus such as the multifunction peripheral 101 according to a security policy set by the security administrator. The user mode forced data forces a setting value on a user mode of the device, and prevents a change of the setting value(s). Authentication information about the security administrator is added to the user mode forced data. The multifunction peripheral 101, the apparatus side, receives the user mode forced data, forces the setting value(s) on the user mode, and prevents a change of the setting value(s). This can prevent the administrator of the apparatus such as the multifunction peripheral 101 from rewriting the user mode through unauthorized use or mishandling. A system that makes the apparatus adhere to the organization's security policy can thus be provided.

Consequently, a mechanism can be provided that can forcefully change the settings of the apparatus to adhere to the security policy, maintain the state of adhering to the security policy, and enable a change of the setting values within the range of maintaining the state.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-159841, filed Aug. 5, 2014, which is hereby incorporated by reference herein in its entirety.

What is claimed is:

1. An information processing system comprising:
 a first information processing apparatus configured to set a security policy; and
 a second information processing apparatus which is subject to a function restriction according to the security policy set by the first information processing apparatus;
 the first information processing apparatus comprising:
 a memory storing instructions; and
 a processor, when the instructions are executed, configured to:
 provide a policy screen, the policy screen being a screen for setting a security policy for enhancing security of the second information processing apparatus;
 hold a conversation rule that associates the security policy with a plurality of setting values and control information;
 generate forced data by converting the security policy set via the policy screen into the plurality of setting values and the control information based on the conversation rule,
 the forced data including information indicating a plurality of setting values for determining an operation of the second information processing apparatus and control information for controlling prohibition of a change of the setting values in the second information processing apparatus, wherein the control information is configured to control such that at least one of the plurality of setting values is allowed to be changed and at least another one of the plurality of setting values is prohibited from being changed; and the second information processing apparatus comprising:

a memory storing instructions; and a processor, when the instructions are executed, configured to:

perform application processing for setting up the setting values included in the forced data generated by the first information processing apparatus in the second information processing apparatus and execute prohibition control on a change of at least one of the setting values based on the control information about the setting values in the forced data, wherein at least one of the setting values is allowed to be changed and at least one of the setting values is prohibited from being changed.

2. The information processing system according to claim 1, wherein the processor of the first information processing apparatus is further configured to convert a setting value of the security policy into a corresponding one or more setting values of the second information processing apparatus.

3. The information processing system according to claim 2, wherein the processor of the first information processing apparatus is further configured to convert the setting value of the security policy into the corresponding one or more setting values of the second information processing apparatus based on a conversion rule according to a model of the second information processing apparatus.

4. The information processing system according to claim 1, wherein the processor of the first information processing apparatus is further configured to transmit the forced data to the second information processing apparatus, and wherein the processor of the second information processing apparatus is further configured to receive the forced data transmitted from the first information processing apparatus.

5. The information processing system according to claim 1, wherein the processor of the second information processing apparatus is further configured to perform the application processing in a case where the forced data is input.

6. The information processing system according to claim 1, wherein the processor of the first information processing apparatus is further configured to generate the forced data based on a security policy of a group attribute of a user of the second information processing apparatus, the forced data including setting values of the second information processing apparatus and control information about the setting values for the group attribute, and wherein the processor of the second information processing apparatus is further configured to perform the application processing on the setting values and the control information, included in the forced data, corresponding to the group attribute of a logging-in user.

7. The information processing system according to claim 6, wherein the second information processing apparatus includes a storage configured to store the forced data, and wherein the processor of the second information processing apparatus is further configured to perform the application processing in response to login of the user.

8. The information processing system according to claim 1, wherein the processor of the first information processing apparatus is further configured to generate forced data including the setting values of the second information processing apparatus, the control information, and an exclusion condition for excluding application of the setting values and the control information, and wherein the processor of the second information processing apparatus is further configured to, if the exclusion condition included in the forced data is satisfied, not perform the application processing on the setting values or the control information corresponding to the exclusion condition.

9. The information processing system according to claim 1, wherein the second information processing apparatus is an image forming apparatus.

10. A method for controlling an information processing system including a first information processing apparatus configured to set a security policy, and a second information processing apparatus which is subject to a function restriction according to the security policy set by the first information processing apparatus, the method comprising:

providing a policy screen for setting a security policy for enhancing security of the second information processing apparatus;

holding a conversion rule that associates the security policy with a plurality of setting values and control information;

generating forced data by converting the security policy set via the policy screen into the plurality of setting values and the controlling information based on the conversation rule the forced data including information indicating a plurality of setting values for determining an operation of the second information processing apparatus and control information for controlling prohibition of a change of the setting values in the second information processing apparatus, wherein the control information is configured to control such that at least one of the plurality of setting values is allowed to be changed and at least another one of the plurality of setting values is prohibited from being changed; and performing application processing by the second information processing apparatus, the application processing including setting up the setting values included in the forced data generated by the first information processing apparatus in the second information processing apparatus and executing a prohibition control on a change of at least one of the setting values based on the control information about the setting values in the forced data wherein at least one of the setting values is allowed to be changed and at least one of the setting values is prohibited from being changed.

* * * * *